United States Patent
Haischt et al.

(10) Patent No.: US 9,600,401 B1
(45) Date of Patent: Mar. 21, 2017

(54) AUTOMATED GUI TESTING (71) Applicant: INTERNATIONAL BUSINESS MACHINES CORPORATION, Armonk, NY (US)

(72) Inventors: Daniel S. Haischt, Herrenberg (DE); Karoline Kasemir, Sindelfingen (DE); Ute Schuerfeld, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/010,076

(22) Filed: Jan. 29, 2016

(51) Int. Cl.
G06F 11/36 (2006.01)
G06F 9/44 (2006.01)
G06F 3/0484 (2013.01)

(52) U.S. Cl.
CPC ........ G06F 11/3664 (2013.01); G06F 3/0484 (2013.01); G06F 8/38 (2013.01); G06F 11/3612 (2013.01); G06F 11/3688 (2013.01)

(58) Field of Classification Search
CPC ............. G06F 11/3664; G06F 11/3688; G06F 11/3612; G06F 8/38; G06F 3/0484
See application file for complete search history.

(56) References Cited

U.S. PATENT DOCUMENTS

| | | | |
|---|---|---|---|
| 5,950,004 A | 9/1999 | Bearse et al. | |
| 6,249,882 B1 | 6/2001 | Testardi | |
| 6,647,513 B1 | 11/2003 | Hekmatpour | |
| 7,231,210 B1 | 6/2007 | Croak et al. | |
| 7,624,378 B2 | 11/2009 | Achlioptas et al. | |
| 7,813,911 B2 | 10/2010 | Triou, Jr. et al. | |
| 7,861,226 B1 * | 12/2010 | Episkopos | G06F 11/3676 717/124 |

(Continued)

FOREIGN PATENT DOCUMENTS

EP 1947567 A2 7/2008

OTHER PUBLICATIONS

Cunha, M., et al., PETTool: A Pattern-Based GUI Testing Tool, 2010 2nd International Conference on Software Technology and Engineering (ICSTE), Oct. 2010, pp. 202-206, [retrieved on Oct. 7, 2016], Retrieved from the Internet: <URL:http://ieeexplore.ieee.org/>.*

(Continued)

*Primary Examiner* — Geoffrey St Leger
(74) *Attorney, Agent, or Firm* — Michael O'Keefe (57) ABSTRACT

The invention relates to a computer system that may include a processor, an accessibility API, a GUI, and a test module. The test module may use the accessibility API for analyzing GUI elements of the GUI and for automatically identifying GUI element features and inter-GUI-element dependencies. The test module may use the GUI element features and inter-GUI-element dependencies to generate a graph. The test module may traverse the graph and analyzes the GUI element features assigned to each currently accessed node or said node's child or sibling node. Thereby, the test module may identify predefined GUI element patterns in the graph and in the GUI. In case a matching GUI element pattern was identified, the test module may automatically identify one or more test routines associated with the identified GUI element pattern and automatically perform the one or more identified test routines on the GUI.

18 Claims, 4 Drawing Sheets

(56) References Cited

U.S. PATENT DOCUMENTS

| | | | |
|---|---|---|---|
| 7,904,892 B2 * | 3/2011 | Babb, II | G06F 8/75 717/105 |
| 7,917,895 B2 | 3/2011 | Givoni et al. | |
| 7,979,849 B2 * | 7/2011 | Feldstein | G06F 11/3684 714/39 |
| 8,108,826 B2 | 1/2012 | Li et al. | |
| 8,271,950 B2 | 9/2012 | Bharadwaj | |
| 8,312,428 B2 | 11/2012 | Zhao | |
| 8,856,746 B2 | 10/2014 | Mishra et al. | |
| 8,990,774 B2 | 3/2015 | Amintafreshi | |
| 2003/0126517 A1 * | 7/2003 | Givoni | G06F 11/3664 714/46 |
| 2003/0221165 A1 * | 11/2003 | Young | G06F 8/38 715/222 |
| 2005/0268285 A1 | 12/2005 | Bagley et al. | |
| 2007/0162894 A1 | 7/2007 | Noller et al. | |
| 2008/0276260 A1 * | 11/2008 | Garlick | G06F 11/3688 719/328 |
| 2009/0217248 A1 * | 8/2009 | Bently | G06F 8/30 717/132 |
| 2010/0281460 A1 | 11/2010 | Tillmann et al. | |
| 2011/0107153 A1 | 5/2011 | Shufer et al. | |
| 2011/0131551 A1 | 6/2011 | Amichai et al. | |
| 2011/0173590 A1 * | 7/2011 | Yanes | G06F 11/3664 717/125 |
| 2011/0239141 A1 | 9/2011 | Wang et al. | |
| 2011/0258611 A1 * | 10/2011 | Dutta | G06F 11/3612 717/128 |
| 2013/0290786 A1 | 10/2013 | Artzi et al. | |
| 2014/0059522 A1 * | 2/2014 | Chandra | G06F 11/3684 717/126 |
| 2014/0109057 A1 * | 4/2014 | Gibbens | G06F 11/3664 717/125 |
| 2014/0189547 A1 * | 7/2014 | Rummler | G06F 3/0484 715/762 |
| 2014/0237451 A1 * | 8/2014 | Koneru | G06F 11/3688 717/124 |
| 2015/0363304 A1 * | 12/2015 | Nagamalla | G06F 11/3688 702/123 |
| 2016/0103756 A1 * | 4/2016 | McClung | G06F 11/3612 714/38.1 |

OTHER PUBLICATIONS

Memon, A., et al., Regression Testing of GUIs, Proceedings of the 9th European software engineering conference/11th ACM SIGSOFT international symposium on Foundations of software engineering, 2003, pp. 118-127, [retrieved on Oct. 7, 2016], Retrieved from the Internet: <URL:http://dl.acm.org/>.*

Costa et al., "Pattern Based GUI testing for Mobile Applications," 9th International Conference on the Quality of Information and Communications Technology, 2014, p. 66-74, IEEE Computer Society.

Hellmann et al., "Rule-Based Exploratory Testing of Graphical User Interfaces," Agile Conference, 2011, p. 107-116, IEEE Computer Society.

Moreira et al., "A Pattern-Based Approach for GUI Modeling and Testing," 24th International Symposium on Software Reliability Engineering (ISSRE), 2013, p. 288-297, IEEE.

Nakajima et al., "GUI Ferret: GUI Test Tool to Analyze Complex Behavior of Multi-Window Applications," International Conference on Engineering of Complex Computer Systems, 2013, p. 163-166, IEEE.

Yuan et al., "GUI Interaction Testing: Incorporating Event Context," IEEE Transactions on Software Engineering, Jul./Aug. 2011, p. 559-574, vol. 37, No. 4, IEEE Computer Society.

* cited by examiner

AUTOMATED GUI TESTING

BACKGROUND

The present invention relates to the testing of software, and more specifically, to the testing of graphical user interfaces (GUIs).

Software applications typically include various modules implementing business logic and include a graphical user interface allowing a user to interact with that business logic, e.g. by entering text via a keyboard or applying a mouse click on elements of the graphical interface. Before a program is released to the public, it typically requires extensive testing in order to ensure that the business function modules as well as the GUI operate correctly and reliably. GUI testing is complex and time-consuming: a software developer requires domain knowledge in order to create appropriate GUI test scenarios that cover all possible user actions or combination of user actions on said GUI. To execute such scenarios manually is highly time-consuming. Often, only a small fraction of the theoretically possible combinations and sequences of actions can be tested. On the other hand, automated GUI tests are highly inflexible. Development cycles in general have become shorter (in particular in agile software development) and software builds are often scheduled on a daily or even hourly basis. In such an agile testing scenario, specifying testing scripts is often not feasible as said scripts may become outdated within hours.

SUMMARY

It is an objective of the present invention to provide for an improved system, method and computer program product for performing GUI tests as specified in the independent claims. Embodiments of the invention are given in the dependent claims. Embodiments of the present invention can be freely combined with each other if they are not mutually exclusive.

According to one embodiment, a method for automatically testing a graphical user interface (GUI) is provided. The method may include using, by a test module, an accessibility application programming interface (API) for analyzing a plurality of GUI elements of the GUI and for automatically identifying a plurality of GUI element features and a plurality of inter-GUI-element dependencies. The method may also include using, by the test module, the plurality of identified GUI element features and the plurality of identified inter-GUI-element dependencies for automatically generating a graph of a plurality of nodes, whereby each node within the plurality of nodes represents a GUI element of the GUI and having assigned the plurality of identified GUI element features and the plurality of identified inter-GUI-element dependencies of the GUI element is represented by each node. The method may further include traversing, by the test module, the generated graph, thereby automatically analyzing the plurality of identified GUI element features assigned to at least one of each currently accessed node and any child node or any sibling node of the currently analyzed node for identifying a plurality of GUI element patterns, whereby a GUI element pattern is a predefined set of one or more nodes having at least one of a plurality of assigned, predefined GUI element features and being a predefined set of two or more nodes representing a plurality of GUI elements linked to each other by a predefined functional dependency. The method may also include, in case a GUI element pattern was identified that matches a set of one or more nodes of the generated graph, automatically identifying, by the test module, one or more test routines associated with the identified GUI element pattern. The method may also include automatically performing, by the test module, the one or more identified test routines on the plurality of analyzed GUI elements in the GUI represented by the plurality of nodes matching the GUI element pattern.

According to another embodiment, a computer program product for automatically testing a GUI is provided. The computer program product may include one or more computer-readable storage devices and program instructions stored on at least one of the one or more tangible storage devices, the program instructions executable by a processor. The computer program product may include program instructions to use, by a test module, an accessibility application programming interface (API) for analyzing a plurality of GUI elements of the GUI and for automatically identifying a plurality of GUI element features and a plurality of inter-GUI-element dependencies. The computer program product may also include program instructions to use, by the test module, the plurality of identified GUI element features and the plurality of identified inter-GUI-element dependencies for automatically generating a graph of a plurality of nodes, whereby each node within the plurality of nodes represents a GUI element of the GUI and having assigned the plurality of identified GUI element features and the plurality of identified inter-GUI-element dependencies of the GUI element represented by each node. The computer program product may further include program instructions to traverse, by the test module, the generated graph, thereby automatically analyzing the plurality of identified GUI element features assigned to at least one of each currently accessed node and any child node or any sibling node of the currently analyzed node for identifying a plurality of GUI element patterns, whereby a GUI element pattern is a predefined set of one or more nodes having at least one of a plurality of assigned, predefined GUI element features and being a predefined set of two or more nodes representing a plurality of GUI elements linked to each other by a predefined functional dependency. The computer program product may also include, in case a GUI element pattern was identified that matches a set of one or more nodes of the generated graph, program instructions to automatically identify, by the test module, one or more test routines associated with the identified GUI element pattern. The computer program product may further include program instructions to automatically perform, by the test module, the one or more identified test routines on the plurality of analyzed GUI elements in the GUI represented by the plurality of nodes matching the GUI element pattern.

In yet another aspect, the invention relates to a computer system that includes a processor, an accessibility API, a GUI and a test module. The GUI includes data objects executable by the processor. The test module includes instructions executable by the processor. The execution of the instructions by the processor may cause the system to use the accessibility API for analyzing GUI elements of the GUI and for automatically identifying GUI element features and inter-GUI-element dependencies. The execution of the instructions by the processor may also cause the system to traverse the graph, thereby automatically analyzing the GUI element features assigned to each currently accessed node and/or assigned to any child or sibling node of the currently analyzed node for identifying GUI element patterns, a GUI element pattern being a predefined set of one or more nodes having assigned predefined GUI element features and/or being a predefined set of two or more nodes representing GUI elements linked to each other by a predefined functional dependency. The execution of the instructions by the processor may further cause the system to in case a GUI element pattern was identified that matches a set of one or more nodes of the graph, automatically identify one or more test routines associated with the identified GUI element pattern. The execution of the instructions by the processor may also cause the system to automatically perform the one or more identified test routines on the GUI elements in the GUI represented by the nodes matching the GUI element pattern.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Embodiments of the invention may have the advantage that a method for automatically testing graphical user interfaces is provided that this capable to rapidly and automatically adapt to any change introduced into a GUI. Although accessibility APIs where originally designed to enable people with disabilities to use the computer, embodiments of the current invention use an accessibility API for a completely different purpose, i.e., for providing a runtime access to a descriptive information about a GUI.

A "graphical user interface" ("GUI") is a piece of software program logic configured to generate and manage data objects which are to be displayed on a display device, e.g. a screen, and which enable a user to interact with the GUI and thereby with an application program interoperatively coupled to said GUI.

A "GUI element" is a data object representing an element of a graphical user interface (GUI). A GUI element may be configured to be displayed on a screen or to be hidden. A GUI element includes a plurality of features (or "attributes"), whereby some of said features specify the shape, layout and/or behavior of an area displayed on a graphical user interface. A GUI element can be a standard GUI element such as a button, a text box, a tab, an icon, a text field, a pane, a check-box item or item group or the like. A GUI element can likewise be a widget provided by program libraries, an image, an alphanumeric character or any combination thereof.

An "accessibility API" (accessibility application programming interface) is a program interface originally intended to be used by developers for creating applications and GUIs that are accessible to persons with permanent or temporary disabilities. "Accessible" applications are compatible with assistive technologies such as screen readers, speech recognition systems, and refreshable braille displays. In some embodiments, the accessibility API acts as a bridge between the operating system and a GUI of an application.

Typically, there are several pieces of information for an object exposed by an accessibility API to other programs, said pieces of information including, in respect to a particular GUI element: its role (for example, it might be a button, an application window or an image), a name identifying the GUI element within the interface (if there is a visible label like text on a button, this will typically be its name, but it could be encoded directly in the object), its state or current condition (for example, a checkbox might currently be selected, partially selected or not selected). Examples for an accessibility API are: Microsoft Active Accessibility (MSAA), Java Accessibility API (a cross platform, toolkit independent API designed to give assistive technologies direct access to the information in user interface), Assistive Technology Service Provider Interface (AT-SPI), the User Interface Automation (UTA) API, the IAccessible2, the UI Accessibility API of Apple (iOS 3), the SWT accessibility API and others.

"Inter-GUI-element dependencies" are functional or structural dependencies between two or more GUI elements of a particular GUI. For example, parent-child relationships or sibling-node-relationships are structural relationships between different GUI elements. Relations indicating that upon a Select action on a first GUI element the state or behavior or data content of a second GUI element changes is an example for a functional dependency.

A "test routine" is a piece of executable program logic, e.g. a rule or a compiled class object configured for testing a test scenario on one or more GUI elements matching a particular pattern. By performing said test scenario, GUI elements which do not function correctly or do not function at all are identified. In case a GUI element is identified that does not function as expected by the test routine, the test routine may, for example, throw an error or write an error notification to a test log.

A "database" as used herein is an information structure which includes one or more data containers, e.g. tables and views, whereby the use of said data containers is controlled by a DBMS. Said "use" may include, for example, reading data from a data container, storing data in a data container, manipulating or evaluating the structure of a data container or planning query execution on multiple ones of said data containers. The database may be a relational database, an object oriented database, or any other kind of database. Accordingly, the DBMS may be a relational DBMS, an object oriented DBMS, an OLAP DBMS, an OLTP DBMS, or any other kind of DBMS.

"Black box testing approaches" are software tests which do not rely on code analysis but rather rely on treating a piece of software on the test as a "black box" and merely evaluate the behavior of the software under test in response to performing some test scripts on the tested software. Compared to black box testing approaches which are based on recorded or manually created test scripts, the automatic testing method according to embodiments of the invention may provide for a much greater flexibility as a plurality of "test paths" is automatically derived from the GUI element graph. Thus, it is neither necessary to manually specify a test script nor to record a sequence of user actions, e.g. by means of a macro recorder, in order to create a test script. Test scripts generated manually or by means of a macro recorder have the disadvantage that in an agile software development approach, said scripts would often have to be rewritten or the recording step would have to be repeated as even minor changes to the GUI structure often result in test script execution failure.

"White box" testing approaches are based on source code analysis in order to generate executable test scripts. Compared to white box testing approaches, embodiments of the invention may have the advantage that it is possible to test a piece of software even in case the source code is not available. By using an accessibility API, embodiments of the invention are able to create a graph of GUI elements, to automate the generation of test scripts by traversing that graph, whereby the accessibility API provides valuable information on the structure, type, and functionalities of the respective GUI elements which allows for the automated identification of topological dependencies and the automated creation and application of test scripts on appropriate GUI elements are GUI element groups.

According to embodiments, the analyzing of the GUI and the generation of the graph is performed at runtime of the GUI. The analysis is devoid of an analysis of source code having been compiled into an executable program logic implementing the GUI.

This may be advantageous as the source code of an application is often not available at the testing system. Commonly, software is developed in a testing environment, e.g. a first computer system. In order to test a new software built, the source code is compiled into an executable code and the executable code is deployed, e.g. via a network, to a second computer system on which the tests are performed. By automatically determining topological and functional properties of a GUI by means of an accessibility API, it is possible to perform the software test and automatically identify test scripts (e.g. based on paths spanning the graph from the root node to a leaf node) by a testing module running on the second computer system even in case the source code is not available on that second computer system.

According to embodiments, the GUI elements under test include or consist of complied, executable program logic whose source code cannot be derived by analyzing a GUI element. Thus, by making use of an accessibility API, topological as well as functional features of GUI elements and GUI element containers can be derived even in case the GUI element per se does not disclose any source code.

According to embodiments, the accessibility API is configured to identify, at runtime of the GUI, the GUI element features and functional GUI-element dependencies for the following types of GUI elements:

Java-swt GUI elements, the GUI being a Java-swt GUI;
Java-Swing GUI elements, the GUI being a Java-Swing GUI;
Html and/or CSS elements, the GUI being a Html and/or CSS and/or JavaScript-based GUI;
GTK ("GIMP-Toolkit") GUI elements, the GUI being a GTK-GUI;
QML ("Qt Meta Language or Qt Modeling Language") GUI elements, the GUI being a QML-GUI; for example, the GTK GUI and/or the QML GUI may be the graphical user interface of an application running on or having been developed for a Linux or UNIX operating system.
iOS GUI elements, the GUI being a GUI of a mobile application running on an iOS operating system;
Android GUI elements, the GUI being a GUI of a mobile application running on an Android operating system.

According to embodiments, the accessibility API is provided by an operating system ("OS") of a data processing machine on which the test module is executed and/or by a program logic library loaded to a GUI test engine including the test module.

According to embodiments, the GUI element features are selected from the group including:

a GUI element type; examples for GUI element types are: "button", "text box", "text area", "check box", "check box item", "radio button group", "radio button", "text field", etc. A "GUI element type" may also specify the type of a widget. A widget (also "graphical control element") is an element of interaction in a GUI, such as a button or a scroll bar, that may be provided by a particular library. Widgets are software components that a computer user interacts with through direct manipulation to read or edit information about an application. User interface libraries, such as e.g. GTK+ or Cocoa, contain a collection of widgets and the logic to render these;
a GUI element label; a GUI element label is a string that is to be displayed next to a particular GUI element;
a GUI element input value; for example, the GUI element input value could be a default value of a text field, the radio button value "selected" of a radio button group;
an option value list, e.g. a predefined list of "allowed" strings;
a type of action associated with the GUI element and affecting only said GUI element; such an action can be, for example: "onClick: changeAttributeValueOfSaidElementToX"; "onClick: setStateOfSaidElementToSELECTED"; "onClick: setAttributeValueOfOtherGUIElementGUIE2ToX"; "onClick: setStateOfOtherGUIElementGUIE2ToSELECTED"; "onMouseover:setColorOfSaidElementToGREEN", etc.;
a GUI element state value, e.g. "SELECTED" or "ACTIVE".

According to embodiments, the functional GUI-element dependencies are selected from the group including:

a parent-child relationship of two GUI elements of predefined types; for example, a radio button group GUI element may be connected to one or more radio button elements by a "includes" parent-child relationship; a drop down menu or an option list may be connected to one or more selectable option items contained in said list also via a "includes" parent child relationship;
a membership within the same GUI container; a GUI container may be, for example, a "panel", a "window", a "dialog-box", a "pane" or the like; a particular "button" GUI and a "text field" GUI included in a particular panel may be connected with each other by a "being contained in same panel" relationship, etc.
a type of action associated with the GUI element and affecting one or more other GUI elements; example for said action-related functional dependencies are: "onClick: openWindowX"; "onClick:changeVarableValueOfOtherGUlElementToX"; "onClick: closeWindowX";
"OnSelectionOfOption1ofDropdownList1:restrict/set some values for another GUI element, e.g. an interlinked drop-down list DropdownList2"; "onClick: openWindowX"; "onSelectOfRadioElementE1: deselectRadioElement2ofSameRadiogroup";

According to embodiments, the GUI element features identified by the accessibility API of one or more nodes of the graph include state information of one or more of the GUI elements of the graph. State information can be, for example, the state "SELECTED" for check boxes, radio buttons or an option in an option list. The test module repeatedly generates a state value that is indicative of a current state of the GUI and the GUI elements contained therein. Each state value is generated as a derivative of at least one GUI element feature of each of the totality of nodes of the graph. The test module analyzes the generated state values for identifying one or more malfunctioning GUI elements. For example, the state values resulting e.g. from a select action of a user or of the test module may be stored to a log of the operating system or of the test module. The log may be implemented as a file or a database table of a relational database management system (DBMS).

Said features may be advantageous as they allow implementing highly generic test routines. For example, a test routine could specify that a user action on a GUI element of a particular set of GUI containers should be encapsulated and should never affect the state of a GUI element in a particular set of other GUI element containers. Another test routine could check if a select action on a GUI element resulted in a state change in at least one GUI element of the GUI. If this is not the case, the GUI element on which the select action was performed may be automatically identified by the test module as a malfunctioning GUI element.

According to embodiments, the generation of one of the state values at a particular time point includes:
 concatenating, by the test module, the GUI element features assigned to the nodes of the graph at the particular time point for generating a concatenated value;
 computing a hash value of the concatenated value; and
 using the hash value as the state value of the GUI generated at the particular time point.

Said features may be advantageous because the test module may be enabled to identify, track and evaluate the state of the GUI under test for automatically identifying malfunctioning GUI elements. Thus, it is not necessary to run a debugger or to set the breakpoints in order to monitor the state of a GUI and its elements in dependence on the actions performed by a user or by a script on said GUI. The concatenated value and also the hash generated therefrom represent unique identifiers of a particular state of a particular GUI. Whenever the GUI is modified, e.g. by setting the state of a particular GUI element to "selected" or "deselected", the concatenated value and also the hash value derived therefrom will change. Thus, by checking if two hash values having been created before and after a particular select action on the GUI are identical or not, it is possible to automatically determine if a particular action on a GUI element recited in the state change of that or any other element of the GUI or not.

According to embodiments, the generation of the state values and the analysis of the state values includes:
 using, by the test module, the GUI element features assigned to all nodes of the graph for generating, at a first time point, a first one of the state values, the first state value being indicative of the state of the GUI and the GUI elements contained therein;
 storing, by the test module, the first state value in a first database including history data of GUI states; the first database can be, for example, a log file or a database table in a relational DBMS.
 applying, by the test module, a select-action on one of the GUI elements of the GUI after the first time point; for example, the select-action event can be triggered by a user of the test module manually or can be triggered by an automated test routine executed by the test module;
 using, by the test module, the accessibility API for recreating the graph after the select-action was applied;
 using, by the test module, the GUI element features assigned to the nodes of the recreated graph for generating, after having applied the select-action at a second time point, a second one of the state values, the second state value being indicative of the state of the accessed GUI and the GUI elements contained therein after the select-action was applied;
 storing, by the test module, the second state value in the first database;
 analyzing the first database for identifying GUI elements contained in a GUI whose state was not changed by a select-action applied on said GUI element; the analysis may be performed by the test module or any other module; and
 in case the analysis of the first database identified one or more of said GUI elements, outputting an error message indicating a malfunction of said identified one or more GUI elements.

According to embodiments, the storing of the first state value in the first database includes using the first state value as a database key for a first data record including human-readable state information on the GUI at the first time point. The storing of the second state value in the first database includes using the state value as a database key for a second data record, the second data record including human-readable state information on the GUI at the second time point. According to embodiments, a database index is created in the database over all state values stored in the database as a key.

Using the state value as a database key may be advantageous, because it is possible to very quickly determine if a particular state of a GUI has already been observed while performing a GUI test or not and to quickly determine if two particular states are identical or not. By using an index, it is possible to avoid a sequential scan for identical key values and rather use the index instead.

According to embodiments, the traversing is performed via multiple different paths. Each path is a set of nodes connecting the root node of the graph with a plurality of different leaf-nodes of the graph or is a set of nodes connecting the root node of a sub-graph of the graph with a plurality of different leaf-nodes of the sub-graph. For each of the multiple paths having been traversed, the test module creates a path-ID from the GUI element features assigned to all nodes contained in said traversed path. Then, the test module stores the path-IDs created in a time period during which the test routines were repeatedly performed on the graph or on the sub-graph in a second database. The second database can be, for example, a log file or a database table of a relational DBMS. The first and the second database can be contained in the same log file or in different log files and/or can be contained in the same database are in different databases. The test routines may be performed automatically, manually or semi-automatically.

Using the accessibility API for identifying visited paths in the graph and generating and storing a path-ID from GUI element features of the nodes in that path may be advantageous, because an automatic method is provided that ensures-for any possible topology or size of a GUI graph provided by the accessibility API—that any path contained in that graph can clearly be identified. In case the path-IDs are stored in a relational database, an index may be created that covers all the path IDs and allow for a particularly fast determination if a particular path was already traversed or not: upon having finished traversing a particular path by the test module, the test module may automatically generate and store a path-ID of a traversed graph in the database.

According to embodiments, the method further includes analyzing, by the test module, all path-IDs in the second database or log for automatically identifying one or more paths whose frequency of traversion is below a threshold.

That features may be advantageous because the accessibility API automatically identifies all paths in a GUI element graph that can be traversed for testing respective GUI elements. That features provide the basis for a more complex statistical analysis on the frequency of path traversal and thus on the frequency of the type of GUI tests performed.

According to embodiments, the method further includes automatically traversing, by the test module, the one or more identified paths whose frequency of traversion is below the threshold, thereby using the accessibility API for automatically identifying GUI element features and inter-GUI-element dependencies of GUI elements represented by the nodes contained in said traversed path and for performing the test routines on the GUI elements in the GUI represented by nodes of said path matching one of the GUI element patterns.

The features may be advantageous as they may ensure that rarely visited paths are identified automatically and the testing routines are specifically performed for the rarely visited paths. According to embodiments, the automated graph traversed can be triggered, for example, by a cron job or other regularly executed job, e.g. on a daily basis.

An example for a pattern P1 matching a particular set of functionally interrelated GUI elements is given below:

A database may include a predefined pattern P1 specifying the following conditions:
"a first GUI element is a selectable GUI element"; AND
Upon a SELECT event, the first GUI element triggers opening of a container including a second GUI element and a third GUI element; AND
the second GUI element includes multiple selectable options; AND
The type of option selected in the second GUI element has an impact on the content of the third GUI element.

This pattern will match with the following sets of GUI elements:
Set1: a GUI element is of type "LINK" triggers, upon being selected, the displaying of a window including a language option list, whereby the selected language determines if a further GUI element in said window being of type "label" displays "Stadt" or "city".
Set2: a GUI element is of type "Button" triggers, upon being selected, the displaying of a panel including a currency check box field, whereby the selected currency/check box item determines if a further GUI element in said panel being of type "label" displays "EURO" or "USD".

The pattern P1 may have assigned one or more test routines to check if particular failure scenarios apply to any set of GUI elements S1, S2 matching the pattern P1. Such failure scenarios respectively being implemented in the form of a test routine R1, R2, and R3 assigned to pattern P1 could be, for example:
R1) The container does not open upon a SELECT event on the first GUI element;
R2) A SELECT action on an option in the second GUI element has no impact on the content of the third GUI element;
R3) A SELECT action on an option in the second GUI element has an erroneous impact on the content of the third GUI element or on one or more other GUI elements of the GUI under test;

According to embodiments, the creation of a path-ID from the GUI element features assigned to all nodes contained in said traversed path including ignoring GUI-element features including GUI element features including state information. Said features may be advantageous, because they ensure that for a particular testing path through the GUI element graph, the test module always creates the same path-ID irrespective of the state of the GUI elements contained in that path.

According to embodiments, the generation of a path-ID of one of the paths includes concatenating, by the test module, at least one GUI element feature of each node contained in said path for generating a concatenated value; and using the concatenated value as the path-ID of the one path.

According to embodiments, the storing of each of the path-IDs in the second database includes using the path-ID as a database key for a second data record including human-readable path information on the nodes contained in the path identified by said path-ID.

According to embodiments, the test module may automatically select the root node of the graph as a starting node for traversing the graph. Typically, the main menu of the GUI under test will be the root node of the graph. For example, the test module may be initialized upon a user selecting a particular GUI element of the GUI under test. The test module may automatically identify a node in the graph representing the selected GUI element. In case the identified node is not the root node of the graph, the test module may automatically navigate to the root node of the graph. In Java Swing, this can be, for example, the top level container. It serves as an anchor point from which all elements of the GUI can be reached.

Before the actual GUI test is started, the test module may identify the state of the whole GUI and store the state value for later evaluation. The state is a derivative of the number, type, features and states of all GUI elements of the graph at test begin. The GUI element graph may also include "hidden" GUI elements not visible to a user and may include nodes that are not testable—e.g. GUI containers such as panes and panels.

According to embodiments, the test module receives configuration data (e.g. by receiving a user's entry via a GUI or reading a configuration file). The configuration data is at least indicative of a user's preference to perform a breadth-first or a depth-first graph traversal. The test module accesses a database including a plurality of different graph traversal algorithms. The plurality of graph traversal algorithms includes at least one breadth-first traversal algorithm and at least one depth-first graph traversal algorithm. It is possible that multiple different breadth-first traversal algorithms and/or multiple depth-first graph traversal algorithms are contained in the configuration data. The test module automatically identifies one of the graph traversal algorithms in the database that best fits to the received configuration data. Then, the test module performs the graph traversal through the graph in accordance with the identified graph traversal algorithm.

Using configurable path traversal strategies may have the advantage that a software tester can easily change the graph traversal strategy depending on the current requirements. For example, in case the GUI has a structure in which GUI elements/nodes of the same level represent highly similar functions, it may be preferable to perform a depth first test strategy ("fast coverage instead of completeness"). Thus, by traversing nodes in the depth first approach, the chance is higher that multiple different GUI element function types are evaluated and that different types of errors can be identified quickly. To the contrary, traversing graph nodes according to the breadth first approach, the coverage of each level of the hierarchical graph is better, but it may happen that all or most of the tested GUI elements relate to the same type of GUI element.

According to embodiments, the test module accesses a current GUI container of the GUI. The current GUI container includes a plurality of the GUI elements of the GUI. The plurality of GUI elements is represented by nodes belonging to a sub-graph of the graph, the sub-graph being a tree. Thus, the graph may include one or more sub-trees. Each sub-tree corresponds to a GUI container (e.g. a window) of the GUI. The GUI container is accessed at runtime of the GUI. The test module uses the sub-graph as the graph for performing the test routines and/or for computing a state value and/or for computing one or more path-IDs of the path spanning said sub-graph.

Said features may be advantageous as they allow for considering sub-graphs related to GUI element containers and the GUI elements contained therein as independent graphs which are traversed and evaluated individually. Thus, it may be possible to perform the testing selectively for individual GUI windows or panes.

Embodiments of the invention may be used in test scenarios where GUI functionalities and business logic functionalities are developed and tested separately at least in an early phase of development. According to embodiments, the GUI, when creating and traversing the graph, is a GUI of an application program that is under development. The application program lacks the desired business functionality partly or completely.

Many existing test tools test the GUI and the underlying function in one and the same test. But, especially in the early phase of GUI testing, there are numerous errors in the GUI itself which could be detected without testing or involving the underlying function. By performing tests which selectively addressed GUI functionalities, it is possible to test a GUI in an early testing phase independent of the business functionality of an application under development.

In a further beneficial aspect, the automation of the GUI testing provided by embodiments of the invention allow to separate the task of GUI element function testing from the task of testing the overall functionality of an application which includes the testing of the correct orchestration of business functions and GUI element functions. Performing the GUI element function testing includes checking navigation paths, checking the implementation of commonly used GUI element patterns and testing easily testable behavior. The testing of the correct orchestration of business logic functions and GUI element functions can often not completely be automated. However, by performing the testing of the "GUI internal" errors automatically, the early phase of GUI testing can tremendously be facilitated and accelerated, thereby freeing testing resources for other tasks. Moreover, a tester can expect the GUI to be of a higher quality when starting with the manual testing phase at a later stage of development. This also helps saving time that can be spent on performing more complex test cases for improving the quality of the product. For automating the first type of tests (the "GUI-internal" tests).

Figure 1:
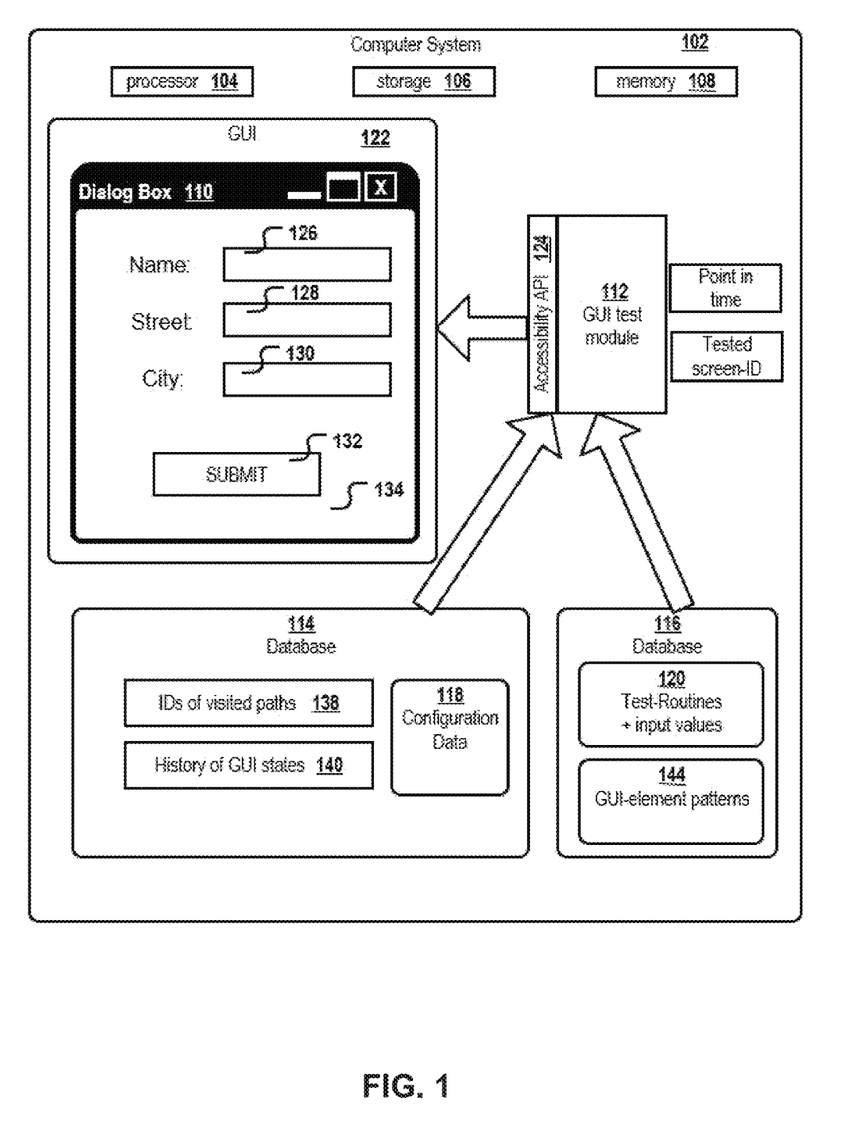
FIG. 1 depicts a system including a GUI and a GUI test execution engine.
Figure 5:
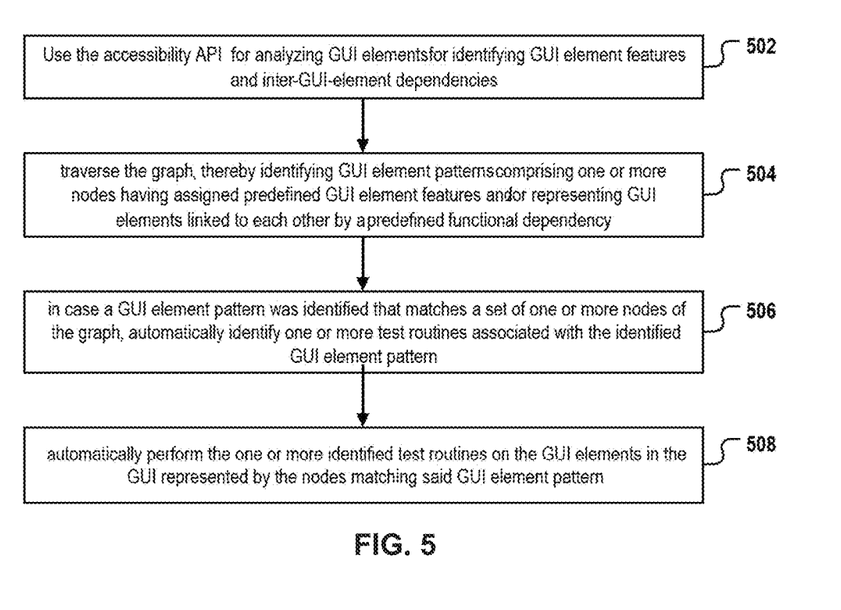
FIG. 5 depicts a flowchart of the method according to an embodiment.

FIG. 1 depicts a computer system 102 including a GUI test module 112 for automatically testing a GUI 122. FIG. 5 depicts a corresponding method for automatically testing a GUI 122. The system 102 of FIG. 1 and method of FIG. 5 will be described together.

The computer system may include one or more processors 104, a volatile main memory 108 and a non-volatile data storage medium 106 including computer-interpretable instructions which implement the test module 112 configured to perform the method depicted in FIG. 5. The test module 112 may be part of a larger software test engine configured for testing GUIs and optionally also further software modules, e.g. software modules related to the business logic of an application to be tested. The GUI 122 may include one or more GUI element containers, e.g. a dialog box 110 including a panel 134 which again includes multiple GUI elements, e.g. a text field 126 for entering a name of a person, a text field 128 for entering a street name, a text field 130 for entering a city and a button 1324 submitting the entered strings to the business logic of the application.

In addition to the test module 112, an accessibility API 124 is installed or stored on the computer system 102. For example, in case the GUI 122 is based on Java Swing classes, the accessibility API may be the "Java Accessibility Utilities". The accessibility API may act as a GUI element reader providing runtime access to descriptive information about the GUI 122. For example, different GUI element types may be identified and their attributes (or at least their testing relevant attributes) may be retrieved.

The test module 112 is configured to use in step 502 the accessibility API for analyzing the GUI elements 126-134 of the GUI and for automatically identifying GUI element features (state, attribute values, element type, assigned actions and other features) of each GUI element and for automatically identifying inter-GUI-element dependencies. The identification of the features and dependencies is performed at runtime of the GUI without performing any source code analysis of the source code underlying the GUI. Rather, the test module parses the structure of a given GUI element, as revealed by the accessibility API, for identifying the GUI element features and interdependencies.

Figure 2:
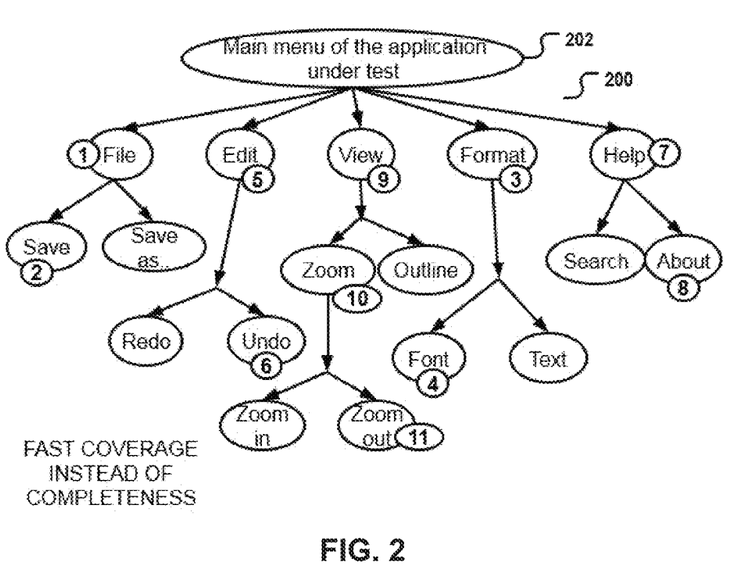
FIG. 2 depicts a GUI element graph traversal scheme.
Figure 3:
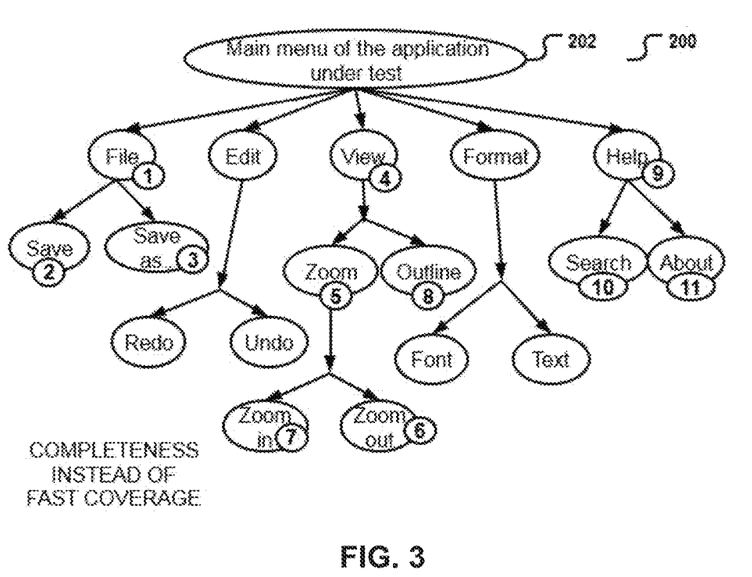
FIG. 3 depicts another GUI element graph traversal scheme.

In step 504, the test module uses the identified features and dependencies for automatically generating a graph 200 of nodes as depicted, for example, in FIGS. 2 and 3. The graph can be, for example, a tree. Each node of the graph represents a GUI element or a GUI element container of the GUI and has assigned the GUI element features and inter-GUI-element dependencies of the GUI element represented by said node. All GUI elements and containers are part of the tree and can be reached from any other GUI element. In an initialization phase of the software/GUI test, the test module traverses the graph. Thereby, it automatically analyzes the identified GUI element features and dependencies assigned to each currently accessed node and/or analyzes the GUI element features and dependencies assigned to any child or sibling node of the currently analyzed node. The analysis is executed for identifying GUI element patterns 144. According to embodiments of the invention, the test module is capable of traversing the graph 200 according to different graph traversal algorithms as depicted, for example, in FIGS. 2 and 3. Which one of the supported graph traversal algorithms is chosen depends, for example, on configuration data 118 that may be dynamically retrieved from a database 114 or from data entered by a user.

A GUI element pattern 144 is a predefined set of one or more nodes having assigned predefined GUI element features and/or is a predefined set of two or more nodes representing GUI elements linked to each other by a predefined functional dependency. For example, a plurality of predefined patterns 144 can be stored in a database 116 that is hosted by the computer system 102 or by a remote computer system accessible by the test module 112 via a network. Each pattern may have assigned one or more test routines 120 configured for testing the functionality of the respective pattern. For example, there may exist test routines for radio button groups (only one radio element in a radio group is allowed to have selected state), for selectable buttons (which should change their own state or the state of at least one other GUI element of the GUI upon being selected) and four sets of one or more functional interconnected GUI elements, e.g. of a combo box whose content depends on the selection of another combo box.

In case the test module identifies a GUI element pattern 144 that matches a set of one or more nodes of the graph 200, the test module automatically identifies in step 506 one or more test routines 120 associated with the identified GUI element pattern 144 and applies that predefined test routine or routines on the GUI elements represented by nodes which match said identified predefined GUI element pattern.

In step 508, the test module automatically performs the one or more identified test routines on the GUI elements in the GUI represented by the nodes matching said GUI element pattern.

FIG. 2 depicts a graph 200 of GUI elements that was generated by the test module by using the accessibility API. It includes nodes having assigned feature values and GUI element interdependencies. The test module may derive feature values and interdependencies e.g. from labels or grouping information of GUI elements, including hidden GUI elements and containers. The features and interdependencies may indicate attributes, states and input values necessary for selecting the next GUI element. Such attributes and interdependencies could be, for example, the type of element (checkbox, input field or button), the state of the elements (if they are "selected" or "active" or not), and "onClick" or "onMouseover" event behavior.

As depicted in FIG. 2, the graph is traversed in step 504 by the test module according to a "breadth first graph traversal" algorithm. Said graph traversal and GUI test algorithm is also referred to as "fast coverage instead of completeness" approach. The main menu of the application under test may constitute the root node 202 of the graph and is chosen a starting node for the GUI test. In Java Swing, the root node is typically the top level container of the GUI.

At first, the whole graph is traversed in order to identify the GUI feature values, including state values, for computing a state value that depends on the state of each GUI element. Preferentially, GUI elements which are hidden are also evaluated and their states are considered during this step. For example, the type and/or the ID and state information of each GUI element (which are assigned to a respective node in the graph) may be concatenated and a hash value may be calculated from the concatenated value. The state value may be stored in a respective table 140 in a database 114 or a log. Then, the graph is traversed a second time to actually perform the GUI test, whereby the root node 202 is again used as a starting node.

According to embodiments, the configuration data 118 configures the test module such that the "breadth first graph traversal" algorithm depicted in FIG. 2 is preferentially performed in a first phase of the software test. FIG. 2 shows a sequence of graph traversal steps as indicated by the numbers. The idea of this algorithm is to test all paths starting from a node in the second top most hierarchical level of the graph (here: "file", "edit", "view", "format", "help") with only one tested node per path and per hierarchical level rather than testing all nodes contained in a particular path. It may have the advantage that errors of GUI elements at a lower position in the hierarchy of the graph are identified earlier compared to the breath first graph traversal algorithm depicted in FIG. 3. Thus, by applying the graph traversal algorithm depicted in FIG. 2, it may be possible to test many different GUI elements with a limited amount of time without trying to achieve complete coverage for only one or very few GUI components in a limited amount of time. As can be inferred from FIG. 2, with the same number of tests steps it is possible to test GUI functions that are dissimilar like "safe" and "zoom". However, functions that are quite similar like "save" and "save as" are not completely covered in this test scenario.

FIG. 3 depicts the graph 200 of GUI elements as described already for FIG. 2 being traversed in step 504 by the test module according to a "depth first graph traversal" algorithm. Said graph traversal and GUI test algorithm is also referred to as "completeness instead of fast coverage" approach.

According to embodiments, the configuration data 118 configures the test module such that the "depth first graph traversal" algorithm depicted in FIG. 3 is preferentially performed in a later phase of the software test. FIG. 3 shows a sequence of graph traversal steps as indicated by the numbers. The idea of this algorithm is to test one or very few paths per given node in the second top most hierarchical level of the graph (here: "file", "edit", "view", "format", "help"), whereby all nodes at all hierarchical levels belonging to an evaluated path are traversed and evaluated path rather than evaluating only one node per path and per level. The approach depicted in FIG. 3 may have the advantage that the whole GUI element graph evaluated and tested and that a high test coverage is provided. As can be inferred from FIG. 3, with the same number of tests steps it is possible to test GUI functions that are similar like "safe" and "save as". However, functions that are quite different like the ones of the "edit" path, are not tested.

According to embodiments, the test module traversing the graph according to a graph traversal algorithm such as depicted, for example in FIG. 2 or 3 may in addition apply a heuristics in order to determine which ones of multiple child nodes to chose as the next node. For example, the test module checks if the end of a navigation path has been reached. In this case, there is no node in the current path in which an action can be performed to navigate to the next GUI element. In case the current GUI element is a "back button" or "home button" or is associated with a new menu entry, the end of the path is not reached.

In the case the test module determines that the currently evaluated GUI element is a "home button" or "back button", the test module checks if a next navigation path can be reached from the container including the currently selected GUI element. For example, this might be the case if the currently evaluated GUI element has assigned an action to open or display a non-tested menu item. If this is the case, the non-tested GUI element (e.g. a non-tested menu item) is selected as the next GUI element to be tested. If this is not the case, the test module automatically selects said "back" or "home" button. Said features may be advantageous as the test module may thus be enabled to autonomously identify the most "interesting" path and avoid repeatedly traversing the same path.

Figure 4:
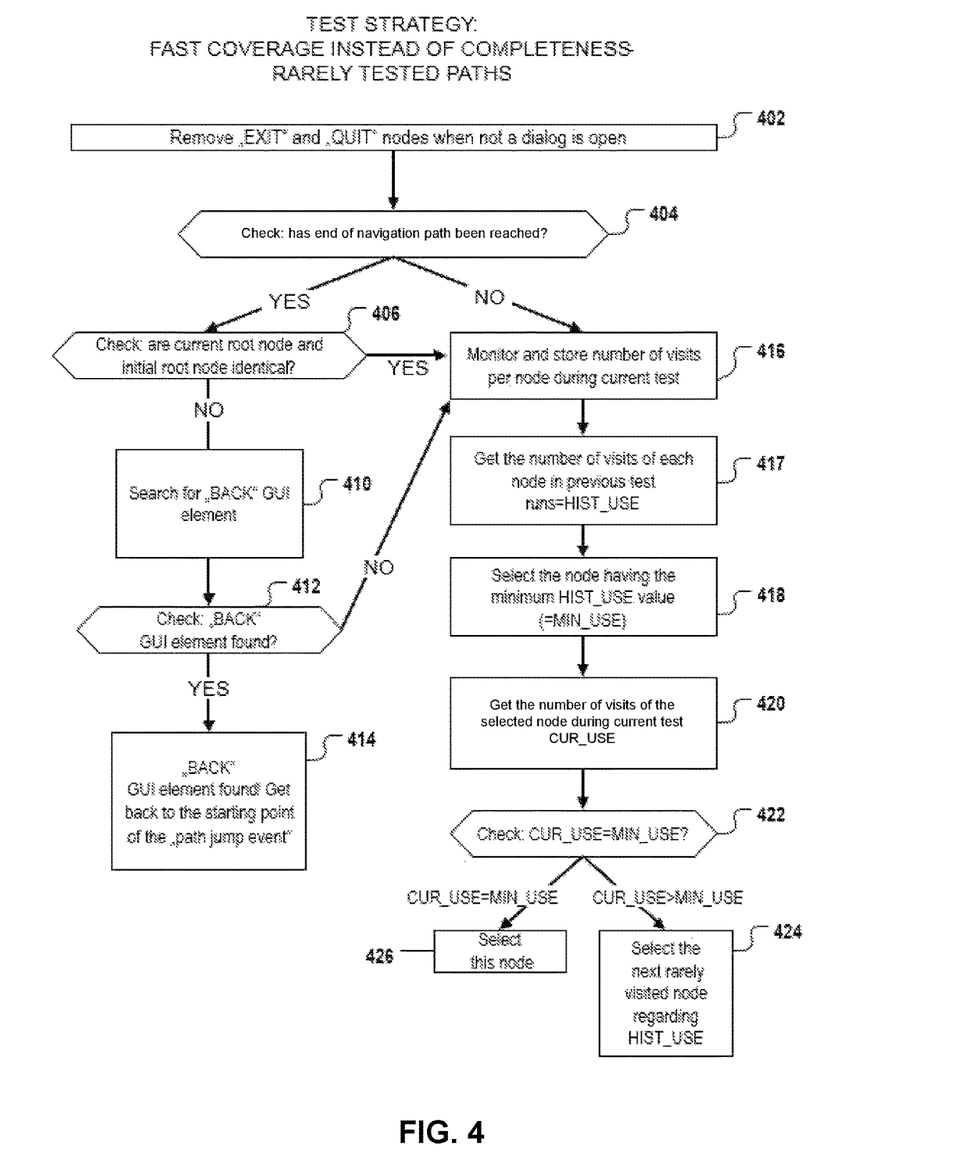
FIG. 4 depicts a flow chart of a testing approach configured to ensure a minimum coverage of different test paths.

FIG. 4 depicts a flow chart of a testing approach according to embodiments of the invention. According to some embodiments, the test module removes in step 402 all GUI elements encoding and exit function, e.g. an "exit" or "quit" button, from the graph 200 of GUI elements. For example, this can be achieved by matching predefined "exit button patterns" against the nodes of the graph. Removing "exit nodes" may have the advantage that the whole test is accelerated, because the termination of a GUI and the re-initialization of a GUI associated with testing and exit function is computationally expensive.

The test module, in step 404, checks if the end of a navigation path has been reached. In this case, there is no node in the current path in which an action can be performed to navigate to the next GUI element. In case a GUI element relates to a "back button" or "home button" or is associated with a new menu entry, the end of the path is not reached.

In the case 406 that the end of the navigation path has been reached (the currently evaluated GUI element is a "home button" or "back button"), the test module checks if the node (e.g. the "File", "Edit", "View", . . . nodes of FIGS. 2 and 3) in the second highest hierarchy of the graph selected when starting traversing the path (the "initial root node") is identical to the "current root node". The "current root node" is one of the nodes (e.g. the "File", "Edit", "View", [ . . . ]) of the second highest level of the currently evaluated path that is reached by traversing the currently evaluated path upwards. Said two root nodes may differ in case during graph traversal the test module selected a node of another path as the next node, e.g. based on a pointer or an initialization action encoded in a currently evaluated GUI element. Such a switching of paths may be called a "path jump event".

In the case 406 that the two compared nodes are identical (i.e., that no path jump event occurred or the test module has meanwhile returned to the initial path), the test module continues with step 416.

If the test module determines in step 406 that said two root nodes are not identical (i.e., the test module has meanwhile switched to another path in the tree) and that the end of the navigation path has been reached, in step 410 the test module searches for a "Back" GUI element, e.g. a "Back" button or link. In case 412 such a "Back" GUI element was found, the test module selects the GUI element that constitutes the starting point of the "path jump event" as the next GUI element to be evaluated in the test. Otherwise, the test module continues with step 416.

According to embodiments, multiple steps 416-426 are performed for identifying and testing the parts of the GUI that have not been tested often during previous manual or automated tests. Depending on the embodiments, steps 416-426 may be combined with steps 406-414 as depicted in FIG. 5 or may be implemented independently of steps 406-414.

In an optional step 402, "exit" and "quit" nodes are removed from the graph as described above.

Before the test module executes steps 417-426, the test module collects, for every automatically or manually executed test, in step 416 the number of visits per node (or at least per node representing a testable GUI element) during the manual or automated test runs. The numbers of visits during previous test runs are stored to a log or a database 144. The previous test runs evaluated may be, for example, all test runs executed in a particular day, in a particular week or in any other suitable time period. In addition, the IDs 138 of the tested paths and/or the input values provided for the different GUI elements, e.g. text fields or text areas or option lists, entered when traversing the different paths, may be stored in the database 114.

Then, for all nodes in the graph (or at least for all nodes representing a testable GUI element), the test module determines in step 417, e.g. by a database lookup, the minimum number of visits observed for said nodes. A "visit" is an event in which the test module determines if a test pattern matches a GUI element represented by said node and, if so, applies a test routine assigned to said matching pattern on the GUI element. Said minimum number of visits in the past is referred to as min(HIST_USE)=MIN_USE.

In step 418, the test module identifies the node having assigned the MIN_USE value as a candidate for the next node whose GUI element is to be tested.

In step 420, the test module determines the number CUR_USE of the selected node, said number indicating how often said selected node has already been visited and tested during the current test run. This value may depend on multiple factors, e.g. the position of the node in the graph, on the selected graph traversal strategy, on the number and type of predefined test patterns 144 and test routines 120 and the database 116 and the like.

In step 422, the CUR_USE and the MIN_USE values are compared. In case 426 the two values are identical, the test module selects this node to perform one or more test routines on said node if it matches a test pattern. In case 424 the CUR_USE value is larger than the MIN_USE value, the test module selects one of the nodes having the second lowest number of visits according to the HIST_USE values assigned to the nodes and performs the test pattern matching and optionally also the test routines on said node with the second lowest HIST_USE value. Said features may be advantageous as they ensure that rarely visited nodes and GUI elements are identified and preferentially used for testing in a fully automated manner.

Figure 6:
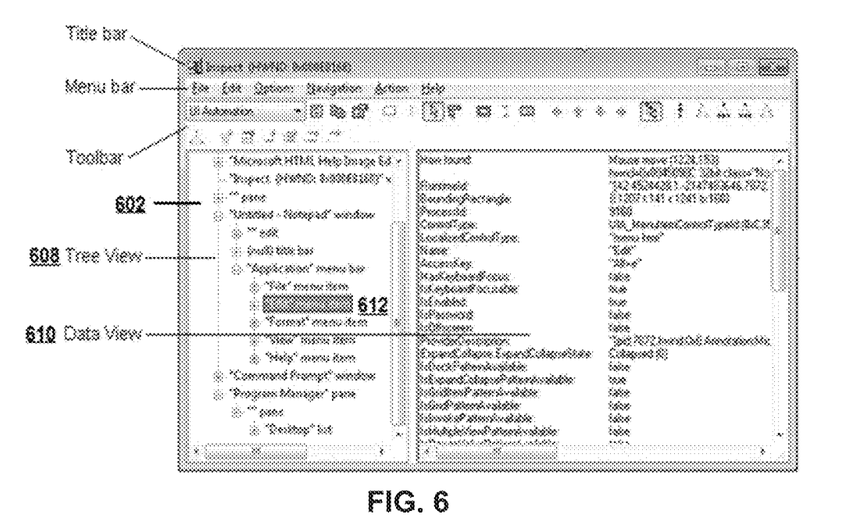
FIG. 6 depicts a screenshot of a GUI testing engine.

FIG. 6 depicts a user interface of a test engine including a test module according to embodiments of the invention. It includes a title bar, a menu bar and a tool bar, a first pane 602 for displaying nodes of a graph 200 and a second pane 610 for displaying individual features and inter-GUI element dependencies of a GUI element represented by a selected node 612 of the graph. A user can perform the selection in the first pane 610 e.g. by clicking on a graphical representation of the node. The graph 200 is generated by using an Accessibility API, e.g. the Java Utility Toolkit or the Windows Accessibility API.

For example, an ID may be generated by the test module by concatenating feature values according to the schema: Key={ControlType}_{ProcessId}_{Name}. For the selected node 612, an ID may be computed by concatenating the following feature values of the node 612 representing the "Edit menu item": "UIA_MenuItemControlTeId_9160_Edit".

By concatenating the dynamically computed node IDs of all nodes contained in a particular path, and by computing a hash value from said concatenated value, a path-ID can be computed.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for automatically testing a graphical user interface (GUI), the method comprising:

using, by a test module, an accessibility application programming interface (API) for analyzing a plurality of GUI elements of the GUI and for automatically identifying a plurality of GUI element features and a plurality of inter-GUI-element dependencies;

using, by the test module, the plurality of identified GUI element features and the plurality of identified inter-GUI-element dependencies for automatically generating a graph of a plurality of nodes, wherein each node within the plurality of nodes represents a GUI element of the GUI and having assigned the plurality of identified GUI element features and the plurality of identified inter-GUI-element dependencies of the GUI element is represented by each node;

traversing, by the test module, the generated graph, thereby automatically analyzing the plurality of identified GUI element features assigned to at least one of each currently accessed node and any child node or any sibling node of the currently analyzed node for identifying a plurality of GUI element patterns, wherein a GUI element pattern is a predefined set of one or more nodes having at least one of a plurality of assigned, predefined GUI element features and being a predefined set of two or more nodes representing a plurality of GUI elements linked to each other by a predefined functional dependency;

in case a GUI element pattern was identified that matches a set of one or more nodes of the generated graph, automatically identifying, by the test module, one or more test routines associated with the identified GUI element pattern;

automatically performing, by the test module, the one or more identified test routines on the plurality of analyzed GUI elements in the GUI represented by the plurality of nodes matching the GUI element pattern;

wherein the plurality of GUI element features identified by the accessibility API of one or more nodes of the generated graph comprises a plurality of state information of one or more of the plurality of GUI elements of the generated graph;

repeatedly generating, by the test module, a state value being indicative of a current state of the GUI and the plurality of GUI elements contained therein, wherein each state value is generated as a derivative of at least one GUI element feature of the plurality of identified GUI element features of each of the plurality of nodes of the generated graph, and wherein generating one of the state values at a particular time point further comprises:

concatenating, by the test module, the plurality of identified GUI element features assigned to the one or more nodes of the generated graph at a particular time point for generating a concatenated value;

computing a hash value of the generated concatenated value; and using the computed hash value as the state value of the GUI generated at the particular time point; and analyzing the generated state values to identify one or more malfunctioning GUI elements.

2. The method of claim 1, wherein the analyzing of the GUI and the generation of the graph is performed at runtime of the GUI, and wherein the analysis is devoid of an analysis of a plurality of source code having been compiled into a plurality of executable program logic implementing the GUI.

3. The method of claim 1, wherein the accessibility API being configured to identify, at runtime of the GUI, the plurality of GUI element features and the plurality of inter-GUI-element dependencies for a plurality of GUI element types, and wherein the plurality of GUI element types include a plurality of Java-swt GUI elements when the GUI is a Java-swt GUI, a plurality of Java-Swing GUI elements when the GUI is a Java-Swing GUI, at least one of a plurality of HTML elements or a plurality of CSS elements when the GUI is at least one of a HTML-based GUI, a CSS-based GUI and JavaScript-based GUI, a plurality of GTK GUI elements when the GUI is a GTK-GUI, a plurality of QML GUI elements when the GUI is a QML-GUI, a plurality of iOS GUI elements when the GUI is a GUI of a mobile application running on an iOS operating system, and a plurality of Android GUI elements when the GUI is a GUI of a mobile application running on an Android operating system.

4. The method of claim 1, wherein the accessibility API being provided by an operating system of a data processing machine on which the test module is at least one of executed and, by a program logic library, loaded to a GUI test engine comprising the test module.

5. The method of claim 1, wherein the plurality of GUI element features are selected from the group comprising at least one of a GUI element type, a GUI element label, a GUI element input value, an option value list, an action type associated with the GUI element and affecting only the GUI element, and a GUI element state value.

6. The method of claim 1, wherein the plurality of inter-GUI-element dependencies are selected from a group comprising at least one of a parent-child relationship between two GUI elements of a plurality of predefined types, a membership on a same GUI container, and an action type associated with the GUI element and affecting one or more other GUI elements.

7. The method of claim 1, wherein generating the state values and analyzing the state values further comprises:

using, by the test module, the plurality of identified GUI element features assigned to all nodes of the generated graph for generating, at a first time point, a first state value, wherein the first state value is indicative of a GUI state and the plurality of GUI elements contained therein;

storing, by the test module, the generated first state value in a first database comprising history data of a plurality of GUI states;

applying, by the test module, a select-action on a GUI element within the plurality of GUI elements of the GUI after the first time point;

using, by the test module, the accessibility API for recreating the generated graph after the select-action was applied;

using, by the test module, the plurality of GUI element features assigned to the plurality of nodes of the recreated graph for generating, after having applied the select-action at a second time point, a second state value, wherein the generated second state value is indicative of an accessed GUI state and the plurality of GUI elements contained therein after the select-action was applied;

storing, by the test module, the generated second state value in the first database;

analyzing the first database to identify a plurality of state unchanged GUI elements contained in a second GUI whose state was not changed by the applied select-action; and in case the analysis of the first database identified one or more state unchanged GUI elements of the plurality of state unchanged GUI elements, outputting an error message indicating a malfunction of the identified one or more state unchanged GUI elements.

8. The method of claim 7, wherein the storing of the first state value in the first database comprises using the first state value as a database key for a first data record comprising a first plurality of human-readable state information on the GUI at the first time point, and wherein the storing of the second state value in the first database comprises using the state value as a database key for a second data record comprising a second plurality of human-readable state information on the GUI at the second time point.

9. The method of claim 7, wherein the traversing is performed via a plurality of different paths, and wherein each path of the plurality of different paths is a first set of nodes connecting a root node of the generated graph with a plurality of different leaf-nodes of the generated graph or a second set of nodes connecting the root node of a sub-graph of the generated graph with a plurality of different leaf-nodes of the sub-graph, and further comprising:
   for each path of the plurality of different paths that has been traversed, creating, by the test module, a path-ID from the plurality of identified GUI element features assigned to all of the plurality of nodes contained in the traversed path; and
   storing, by the test module, each path-ID created in a time period during which the plurality of test routines were repeatedly performed on the generated graph or on the sub-graph in a second database.

10. The method of claim 9, further comprising:
    analyzing each stored path-ID in the second database or a log for automatically identifying one or more other paths within the plurality of different paths whose frequency of traversion is below a threshold.

11. The method of claim 10, further comprising:
    automatically traversing, by the test module, the one or more identified other paths whose frequency of traversion is below the threshold, thereby using the accessibility API for automatically identifying the plurality of identified GUI element features and the plurality of identified inter-GUI-element dependencies of the plurality of GUI elements represented by the plurality of nodes contained in the traversed path and for performing the plurality of test routines on the plurality of GUI elements in the GUI represented by the plurality of nodes of the traversed path matching one of the plurality of GUI element patterns.

12. The method of claim 9, wherein the creation of the path-ID from the plurality of identified GUI element features assigned to all of the plurality of nodes contained in the traversed path comprises ignoring a plurality of state information-related GUI-element features.

13. The method of claim 9, wherein creating the path-ID further comprises:
    concatenating, by the test module, at least one node GUI element feature contained in the path for generating a concatenated value; and
    using the concatenated value as the path-ID of the path.

14. The method of claim 9, wherein storing of each path-ID in the second database comprises using the path-ID as a database key for a second data record comprising human-readable path information on the plurality of nodes contained in the path identified by the path-ID.

15. The method of claim 1, further comprising:
    receiving, by the test module, a plurality of configuration data being at least indicative of a user's preference to perform a breadth-first graph traversal or a depth-first graph traversal;
    accessing, by the test module, a database comprising a plurality of different graph traversal algorithms, wherein the plurality of graph traversal algorithms comprises at least one of at least one breadth-first traversal algorithm and at least one depth-first graph traversal algorithm;
    automatically identifying, by the test module, at least one graph traversal algorithm in the plurality of graph traversal algorithms in the database that is a best fit to the plurality of received configuration data; and
    performing, by the test module, a graph traversal through the generated graph in accordance with the identified graph traversal algorithm.

16. The method of claim 1, further comprising:
    accessing, by the test module, a GUI container of the GUI, wherein the GUI container comprises the plurality of GUI elements of the GUI, and wherein the plurality of GUI elements are represented by a plurality of sub-graph nodes belonging to a sub-graph of the generated graph, and wherein the sub-graph is a tree; and
    using the sub-graph for at least one of performing the test routines, computing a state value, and computing one or more path-IDs of a path spanning the sub-graph.

17. A computer program product for automatically testing a GUI, the computer program product comprising:
    one or more computer-readable tangible storage medium and program instructions stored on at least one of the one or more tangible storage medium, the program instructions executable by a processor, the program instructions comprising:
    program instructions to use, by a test module, an accessibility application programming interface (API) for analyzing a plurality of GUI elements of the GUI and for automatically identifying a plurality of GUI element features and a plurality of inter-GUI-element dependencies;
    program instructions to use, by the test module, the plurality of identified GUI element features and the plurality of identified inter-GUI-element dependencies for automatically generating a graph of a plurality of nodes, wherein each node within the plurality of nodes represents a GUI element of the GUI and having assigned the plurality of identified GUI element features and the plurality of identified inter-GUI-element dependencies of the GUI element represented by each node;
    program instructions to traverse, by the test module, the generated graph, thereby automatically analyzing the plurality of identified GUI element features assigned to at least one of each currently accessed node and any child node or any sibling node of the currently analyzed node for identifying a plurality of GUI element patterns, wherein a GUI element pattern is a predefined set of one or more nodes having at least one of a plurality of assigned, predefined GUI element features and being a predefined set of two or more nodes representing a plurality of GUI elements linked to each other by a predefined functional dependency;
    in case a GUI element pattern was identified that matches a set of one or more nodes of the generated graph, program instructions to automatically identify, by the test module, one or more test routines associated with the identified GUI element pattern;
    program instructions to automatically perform, by the test module, the one or more identified test routines on the plurality of analyzed GUI elements in the GUI represented by the plurality of nodes matching the GUI element pattern;
    wherein the plurality of GUI element features identified by the accessibility API of one or more nodes of the generated graph comprises a plurality of state information of one or more of the plurality of GUI elements of the generated graph;
    program instructions to repeatedly generate, by the test module, a state value being indicative of a current state of the GUI and the plurality of GUI elements contained therein, wherein each state value is generated as a derivative of at least one GUI element feature of the plurality of identified GUI element features of each of the plurality of nodes of the generated graph, and wherein generating one of the state values at a particular time point further comprises:
  program instructions to concatenate, by the test module, the plurality of identified GUI element features assigned to the one or more nodes of the generated graph at a particular time point for generating a concatenated value;
  program instructions to compute a hash value of the generated concatenated value; and
  program instructions to use the computed hash value as the state value of the GUI generated at the particular time point; and
program instructions to analyze the generated state values to identify one or more malfunctioning GUI elements.

18. A computer system comprising:
a processor;
an accessibility application program interface (API);
a GUI, wherein the GUI comprises a plurality of data objects executable by the processor;
a test module, wherein the test module comprises a plurality of instructions executable by the processor, and wherein the execution of the plurality of instructions by the processor causes the system to:
use the accessibility API for analyzing a plurality of GUI elements of the GUI and for automatically identifying a plurality of GUI element features and a plurality of inter-GUI-element dependencies;
use the plurality of identified GUI element features and the plurality of identified inter-GUI-element dependencies for automatically generating a graph of a plurality of nodes, wherein each node within the plurality of nodes represents a GUI element of the GUI and having assigned the plurality of identified GUI element features and the plurality of identified inter-GUI-element dependencies of the GUI element is represented by each node;
traverse the generated graph, thereby automatically analyzing the plurality of identified GUI element features assigned to at least one of each currently accessed node and any child node or any sibling node of the currently analyzed node for identifying a plurality of GUI element patterns, wherein a GUI element pattern is a predefined set of one or more nodes having at least one of a plurality of assigned, predefined GUI element features and being a predefined set of two or more nodes representing a plurality of GUI elements linked to each other by a predefined functional dependency;
in case a GUI element pattern was identified that matches a set of one or more nodes of the generated graph, automatically identify, by the test module, one or more test routines associated with the identified GUI element pattern;
automatically perform, by the test module, the one or more identified test routines on the plurality of analyzed GUI elements in the GUI represented by the plurality of nodes matching the GUI element pattern;
wherein the plurality of GUI element features identified by the accessibility API of one or more nodes of the generated graph comprises a plurality of state information of one or more of the plurality of GUI elements of the generated graph;
repeatedly generating, by the test module, a state value being indicative of a current state of the GUI and the plurality of GUI elements contained therein, wherein each state value is generated as a derivative of at least one GUI element feature of the plurality of identified GUI element features of each of the plurality of nodes of the generated graph, and wherein generating one of the state values at a particular time point further comprises:
  concatenating, by the test module, the plurality of identified GUI element features assigned to the one or more nodes of the generated graph at a particular time point for generating a concatenated value;
  computing a hash value of the generated concatenated value; and
  using the computed hash value as the state value of the GUI generated at the particular time point; and
analyzing the generated state values to identify one or more malfunctioning GUI elements.

* * * * *